United States Patent
Tanizawa

(10) Patent No.: US 6,724,202 B2
(45) Date of Patent: Apr. 20, 2004

(54) PHYSICAL QUANTITY DETECTION DEVICE WITH TEMPERATURE COMPENSATION

(75) Inventor: Yukihiko Tanizawa, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/986,313

(22) Filed: Nov. 8, 2001

(65) Prior Publication Data

US 2002/0083776 A1 Jul. 4, 2002

(30) Foreign Application Priority Data

Nov. 10, 2000 (JP) .......................... 2000-343670

(51) Int. Cl.$^7$ .............................. G01R 17/10; G01L 9/04
(52) U.S. Cl. ...................... 324/725; 324/71.1; 324/721; 73/726; 338/3
(58) Field of Search ................. 324/720–721, 324/725, 549, 526, 693, 76.79; 73/720, 726; 702/133, 99, 139, 136, 104; 374/143, 184; 338/3

(56) References Cited

U.S. PATENT DOCUMENTS

| | | | |
|---|---|---|---|
| 4,233,848 A | * | 11/1980 | Sato et al. ...................... 73/727 |
| 4,576,052 A | * | 3/1986 | Sugiyama ................. 73/862.68 |
| 4,890,497 A | * | 1/1990 | Cahill .......................... 73/708 |
| 5,042,307 A | * | 8/1991 | Kato ............................ 73/708 |
| 5,418,455 A | * | 5/1995 | Takaishi et al. ........ 324/207.21 |

FOREIGN PATENT DOCUMENTS

| | | |
|---|---|---|
| JP | A-57-58791 | 12/1982 |
| JP | A-60-144632 | 7/1985 |
| JP | B2-62-55629 | 11/1987 |
| JP | A-63-173933 | 7/1988 |
| JP | A-3-51733 | 3/1991 |
| JP | A-3-68830 | 3/1991 |
| JP | B2-3-67211 | 10/1991 |
| JP | A-4-2170 | 1/1992 |
| JP | A-4-25767 | 1/1992 |
| JP | A-4-89541 | 3/1992 |

OTHER PUBLICATIONS

Sugiyama et al., "Nonlinear Temperature Characteristics in Silicon Piezoresistive Pressure Sensors," *Proceedings of the 5$^{th}$ Sensor Symposium*, 1985, pp. 103–107.

* cited by examiner

Primary Examiner—Anjan K. Deb
(74) Attorney, Agent, or Firm—Posz & Bethards, PLC

(57) ABSTRACT

First and second resistors (sensing elements) are connected in series between first and second potentials. The junction point voltage between the first and second resistor is supplied to an inverting input of a first operational amplifier. The non-inverting input is supplied with a reference voltage Vref generated by third and fourth resistors. A feedback resistor is connected between output and inverting input of the operational amplifier OP1. The difference between a temperature coefficient of resistance TCR of the sensing elements and a temperature coefficient of sensitivity TCS is equalized to a temperature coefficient of resistance of the feedback resistor. Further, the reference voltage is unchanged in accordance with the detected physical quantity or temperature variation.

22 Claims, 11 Drawing Sheets

PHYSICAL QUANTITY DETECTION DEVICE WITH TEMPERATURE COMPENSATION

BACKGROUND OF THE INVENTION

1. Field of the Invention

This invention relates to a physical quantity detection device for detecting a physical quantity through resistance variation with temperature compensation.

2. Description of the Prior Art

A physical quantity detection device for detecting a physical quantity through resistance variation with temperature compensation is disclosed in Japanese patent No. 2976487. FIG. 5 is a schematic circuit diagram of this prior art physical quantity detection device (pressure sensor). This physical quantity detection device has four operational amplifiers OP11 to OP14.

The operational amplifier OP11 compensates a temperature characteristic of sensitivity by supplying a constant current to a Wheatstone bridge including strain gages for detecting a pressure. The operational amplifier OP12 and the operational amplifier OP13 are used as voltage-followers to suppress an error due to directly drawing an output current from the bridge output. The operational amplifier OP14 amplifiers the pressure detection signal and shifts the zero point. This physical quantity detection device provides a physical quantity detection signal with accuracy over a wide temperature range.

However, in consideration of reduction in cast and in the area occupied by this circuit on an IC chip, the number of the operational amplifiers should be reduced.

Japanese patent No. 3-67211 (U.S. Pat. No. 4,576,052) discloses another prior art physical quantity detection device satisfying this requirement. FIG. 6 is a schematic circuit diagram of this prior art physical quantity detection device including two operational amplifiers. This prior art physical quantity detection device provides the same function as the physical quantity detection device shown in FIG. 5 with only two operational amplifiers. In the case that the physical quantity detection device is used as a pressure sensor in motor vehicles, it is generally required that the physical quantity detection device is driven by a single power supply of 5 V, so that the output voltage range is from 0.5 to 4.5 V. Moreover, it is further required that the output voltage increases with an increase in pressure. Thus, in consideration of these general requirements, the prior art physical quantity detection device shown in FIG. 6 has the following disadvantages.

First, in the physical quantity detection device (pressure sensor) shown in FIG. 6, the operational amplifier OP21 is used as a differential amplifier. Thus, the operational amplifier OP21 outputs 0 V when there is no pressure on the stain gages Ra' to Rd', and the output voltage increases with increase in the pressure.

In the general operational amplifier, the output voltage is limited at high and low voltages in the output voltage range. That is, near the supply voltage, the output voltage is limited by the voltage (Vcc) of the power supply, and near the ground level, the output voltage is subjected to the low voltage limit such as transistor's $|Vce(sat)| \approx 0.2$ V. Moreover, when a difference between two pressures is measured, this circuit cannot generate a negative voltage, so that the output cannot represent the negative pressure.

Second, in the above-mentioned structure, because of the single supply voltage, the output voltage range starts from 0.5 V. Thus, it is required to shift the zero point of the output signal. Accordingly, the operational amplifier OP22 at the last stage should be used as an inverting type operational amplifier having a summing input. However, in this structure, the output voltage of the last stage of operational amplifier OP22 decreases with increase in the output voltage at the previous stage of the operational amplifier OP21 when the pressure increases. That is, the output characteristic of the pressure sensor shown in FIG. 6 is as shown in FIG. 7. This is an inverted characteristic with respect to the required output characteristic for the pressure sensor.

The pressure sensor disclosed in Japanese patent application provisional publication No. 3-51733 (U.S. Pat. No. 5,042,307) clears this requirement. FIG. 8 is a schematic circuit diagram of this prior art pressure sensor(physical quantity detection device). This pressure sensor is developed to have operation which is the same as the prior art pressure sensor having four operational amplifiers shown in FIG. 5. In this pressure sensor shown in FIG. 8, a feedback resistor Rh has a temperature dependency for compensating a temperature characteristic of sensitivity. Moreover, its offset temperature characteristic can be adjusted also. However, if only offset is simply adjusted, because the feedback resistor Rh has temperature dependency, in order to cancel the temperature dependency, it is necessary to equalize TCRs (temperature coefficients of resistance) in the combined resistance of the resistors Ri, R27, and R29 and the combined resistance of the resistors Rj, R28, and R30 to that of the combined resistance of the resistors Rh and R26.

Moreover, in the actual offset adjustment and the actual offset temperature adjustment, the resistors R27, R29, R28, and R30 are adjusted adequately. However, trimming any of these resistors varies the offset temperature characteristic due to the presence of the temperature dependency in the feedback resistor Rh. That is, in this pressure sensor, accurate adjustment cannot be provided because the offset and offset temperature dependency cannot be adjusted independently.

There is a further problem in this pressure sensor. That is, the non-inverting input of the operational amplifier OP32 at the second stage is supplied with the output of the bridge, so that this operational amplifier OP32 operates with a reference potential including the pressure detection signal which is not amplified. Thus, adjusting the offset and offset temperature characteristic in the second stage by trimming any of the resistors R27, R28, R30 slightly exercises an influence on the pressure detection signal component. That is, this structure exercises an influence on the adjustment in the sensitivity. Thus, if the offset and the offset temperature characteristic are adjusted after adjustment of the sensitivity, the accuracy in the sensitivity will decrease because the adjustment in the sensitivity deviates slightly from the previous state. Inversely, if the offset in the bridge, the offset (voltage), and the offset temperature characteristic are adjusted before the sensitivity adjustment, the offset and offset temperature characteristic deviates from the adjusted values.

Accordingly, the physical quantity detection device such as the pressure sensor is required to output an accurate detection signal with temperature compensation using a single power supply and a low number of amplifiers even at a voltage near the ground potential and a negative potential, and the adjustment should be easy with accuracy.

SUMMARY OF THE INVENTION

The aim of the present invention is to provide a superior physical quantity detection device.

According to the present invention, a first aspect of the present invention provides a physical quantity detection device including: an operational amplifier; a first resistor connected between an inverting input of the operational amplifier and a first reference potential; a second resistor connected between the inverting input of the operational amplifier and a second reference potential, the first and second resistors having a first temperature coefficient of resistance; a feedback resistor being connected between the inverting input of the operational amplifier and an output of the operational amplifier and having a second temperature coefficient of resistance; and a reference voltage generation circuit generating a reference voltage supplied to a non-inverting input of the operational amplifier, at least one of the first and second resistors including a sensing element of which resistance varies on the basis of a physical quantity with a temperature coefficient of sensitivity, wherein a difference between the first temperature coefficient of resistance and the temperature coefficient of sensitivity is substantially equal to the second temperature coefficient of resistance.

According to the present invention, a second aspect of the present invention provides the physical quantity detection device based on the first aspect, wherein each of the first and second resistors and the feedback resistor includes a diffused resistor and a concentration of impurity of the feedback resistor is different from concentrations of impurity of the first and second resistors.

According to the present invention, a third aspect of the present invention provides the physical quantity detection device based on the second aspect, wherein the concentrations of impurity of the first and second resistors are from $0.4 \times 10^{19}$ cm$^{-3}$ to $8 \times 10^{19}$ cm$^{-3}$ and the concentration of impurity of the feedback resistor is from $1.6 \times 10^{17}$ cm$^{-3}$ to $7 \times 10^{17}$ cm$^{-3}$. Moreover, the concentrations of impurity of the first and second resistors may be from $0.8 \times 10^{19}$ cm$^{-3}$ to $4 \times 10^{19}$ cm$^{-3}$ and the concentration of impurity of the feedback resistor is from $2.5 \times 10^{17}$ cm$^{-3}$ to $5.5 \times 10^{17}$ cm$^{-3}$. Furthermore, the concentrations of impurity of the first and second resistors may be about $1 \times 10^{19}$ cm$^{-3}$, and the concentration of impurity of the feedback resistor is about $4 \times 10^{17}$ cm$^{-3}$.

According to the present invention, a fourth aspect of the present invention provides the physical quantity detection device based on the first aspect, wherein one of the first and second resistors includes the sensing element of which resistance varies on the basis of the physical quantity, and a resistance of the other of the first and second resistors does not vary with the physical quantity.

According to the present invention, a fifth aspect of the present invention provides the physical quantity detection device based on the first aspect, wherein the reference voltage generation circuit includes third and fourth resistors connected in series between the first and second reference potentials and generates a divided voltage as the reference voltage, and a temperature coefficient of resistance of the third resistor is substantially equal to a temperature coefficient of resistance of the fourth resistor.

According to the present invention, a sixth aspect of the present invention provides the physical quantity detection device based on the fifth aspect, wherein one of the third and fourth resistors has a trimming structure to trim the reference voltage toward an output voltage of the operational amplifier when the physical quantity is zero.

According to the present invention, a seventh aspect of the present invention provides the physical quantity detection device based on the first aspect, further including a resistor having a trimming structure and that is connected in parallel to the feedback resistor.

According to the present invention, an eighth aspect of the present invention provides the physical quantity detection device based on the first aspect, further including: a third resistor; another operational amplifier having an inverting input supplied with an output of the operational amplifier through the third resistor, a non-inverting input of the another operational amplifier being supplied with the reference voltage; and a fourth resistor disposed between an output terminal and inverting input of the another operational amplifier.

According to the present invention, a ninth aspect of the present invention provides the physical quantity detection device based on the eighth aspect, further including an offset trimming resistor between the first reference potential and the inverting input of the another operational amplifier.

According to the present invention, a tenth aspect of the present invention provides the physical quantity detection device based on the eighth aspect, further including an offset trimming resistor between the second reference potential and the inverting input of the another operational amplifier.

According to the present invention, an eleventh aspect of the present invention provides the physical quantity detection device based on the eighth aspect, further including fifth and sixth resistors connected between the first reference potential and the inverting input of the second operational amplifier and seventh and eighth resistors connected between the inverting input of the another operational amplifier and the second reference potential, wherein the sixth and seventh resistors have temperature dependencies of resistance.

According to the present invention, a twelfth aspect of the present invention provides the physical quantity detection device based on the eleventh aspect, wherein at least one of the fifth and eighth resistors has a trimming structure for compensating a temperature characteristic of offset of the output of the another operational amplifier.

According to the present invention, a thirteenth aspect of the present invention provides the physical quantity detection device wherein if it is assumed that a sensitivity of the sensing element at a reference temperature is S0, a resistance of the sensing element at the reference temperature is R0, and a resistance of the feedback resistor at the reference temperature is Rts0, then, it is represented that the sensitivity of the sensing element at a temperature t which is different from the reference temperature by T is S(T), the resistance of the sensing element at t is R(T), and the resistance of the feedback resistor at t is Rts(T), and S(T), R(T), and Rts(T) are further represented by: $S(T)=S0 \cdot (1+\beta1 \cdot T+\beta2 \cdot T^2)$, $R(T)=R0 \cdot (1+\alpha1 \cdot T+\alpha2 \cdot T^2)$, and $Rts(T)=Rts0 \cdot (1+A1 \cdot T+A2 \cdot T^2)$, where $\alpha1$, $\alpha2$, $\beta1$, $\beta2$, A1, and A2 are temperature coefficients, and wherein $\alpha1$, $\alpha2$, $\beta1$, $\beta2$, A1, and A2 are determined so as to establish both $A1=\alpha1-\beta1$ and $A2=\alpha2-\beta2-\beta1 \cdot (\alpha1-\beta1)$.

According to the present invention, a fourteenth aspect of the present invention provides the physical quantity detection device based on the first aspect, wherein the reference voltage is determined such that almost all of a current flowing through the first resistor flows into the second resistor.

According to the present invention, a fifteenth aspect of the present invention provides a physical quantity detection device including: an operational amplifier; a first resistor connected between an inverting input of the operational amplifier and a first reference potential; a second resistor connected between the inverting input of the operational amplifier and a second reference potential, the first and second resistors having a first temperature coefficient of resistance; a feedback resistor being connected between the inverting input of the operational amplifier and an output of the operational amplifier and having a second temperature coefficient of resistance; a reference voltage generation circuit generating a reference voltage supplied to a non-inverting input of the operational amplifier, at least one of the first and second resistors including a sensing element of which resistance varies on the basis of a physical quantity with a temperature coefficient of sensitivity, wherein the reference voltage generation circuit includes a third resistor and a fourth resistor connected in series between the first and second reference potentials and generates a divided voltage as the reference voltage, and a temperature coefficient of the third resistor is substantially equal to a temperature coefficient of the fourth resistor.

According to the present invention, a sixteenth aspect of the present invention provides a physical quantity detection device including: an operational amplifier; a first resistor connected between an inverting input of the operational amplifier and a first reference potential; a second resistor connected between the inverting input of the operational amplifier and a second reference potential, the first and second resistors having a first temperature coefficient of resistance; a feedback resistor being connected between the inverting input of the operational amplifier and an output of the operational amplifier and having a second temperature coefficient of resistance; a reference voltage generation circuit generating a reference voltage supplied to a non-inverting input of the operational amplifier, at least one of the first and second resistors including a sensing element of which resistance varies on the basis of a physical quantity with a temperature coefficient of sensitivity, a third resistor; another operational amplifier, an inverting input of the another operational amplifier being supplied with an output of the operational amplifier through the third resistor, a non-inverting input of the another operational amplifier being supplied with the reference voltage; and a fourth resistor disposed between an output terminal and the inverting input of the another operational amplifier.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

In this embodiment, a pressure sensor is described as an example of a physical quantity detection device according to the present invention.

Figure 1:
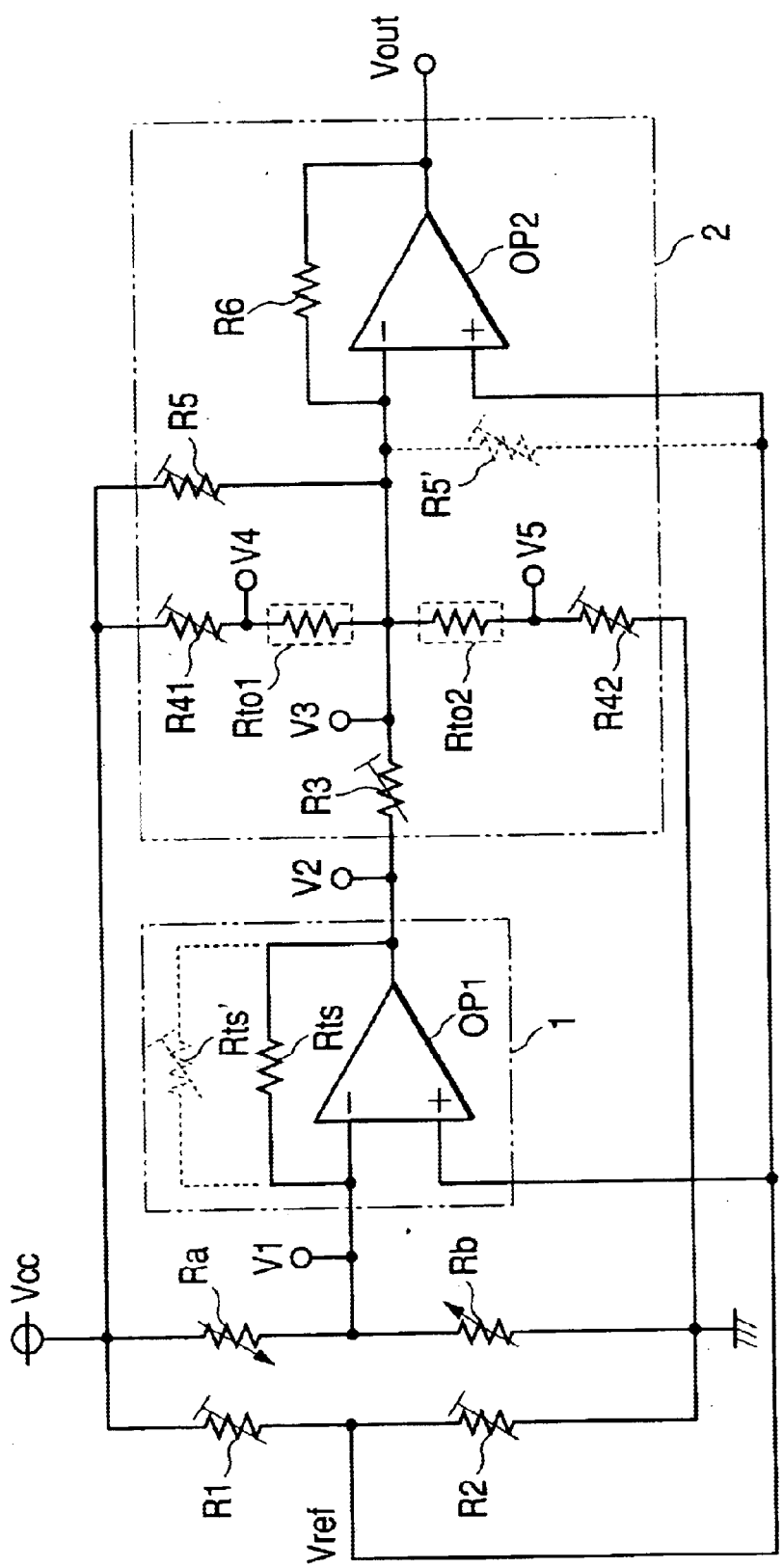
FIG. 1 is a schematic circuit diagram of a pressure sensor according to the present invention.

FIG. 1 is a schematic circuit diagram of a pressure sensor according to a first embodiment.

First Embodiment

The pressure sensor includes diffused resistors Ra and Rb, a sensitivity temperature characteristic compensation circuit 1, an offset and offset temperature characteristic compensation circuit 2. The resistors Ra and Rb having the piezoresistance effect to act as strain gages (sensing elements) are connected in series and connected between a first reference potential point supplied with a supply voltage Vcc (for example, 5 V) and a second reference potential which is lower than the first potential (the ground potential in this embodiment). Variation of resistances of these diffused resistors Ra and Rb with the pressure variation is detected and outputted at an output terminal Vout as a sensor output, wherein the sensitivity temperature characteristic compensation circuit 1 and the offset and offset temperature characteristic compensation circuit 2 compensate the temperature characteristic in sensitivity, offset, and offset temperature characteristic.

The sensitivity temperature characteristic compensation circuit 1 includes an operational amplifier OP1 and a feedback resistor Rts connected between an inverting input and an output of the operational amplifier OP1. The inverting input of the operational amplifier OP1 is further supplied with a divided voltage (middle voltage of the supply voltage) V1 of the resistors Ra and Rb, and its non-inverting input is supplied with a reference voltage Vref derived by dividing the supply voltage Vcc by the resistors R1 and R2 connected in series. The reference voltage Vref is set to a half of the supply voltage Vcc (Vcc/2). The operational amplifier OP1 operates such that the middle voltage V1 does not vary with respect to the reference voltage Vref. Thus, the voltage variation appears firstly at the output of the operational amplifier OP1. That is, the output V2 of the operational amplifier OP1 and the reference voltage Vref correspond to two outputs of the general bridge circuit. Here, it is noted that this invention adopts the half bridge structure including the resistors Ra and Rb as a strain gage bridge.

The resistors R1 and R2 generate the reference voltage Vref as follows:

Generally, if a Wheatstone bridge is constructed with strain gages, the zero point deviates due to slight desperations among four diffused resistors such as dispersion in line width of diffused resistors, so that an offset voltage appears. Thus, conventionally offset adjustment was necessary before adjustment of pressure sensitivity and was carried out with either of the circuits shown in FIG. 2A or FIG. 2B.

Figure 2A:
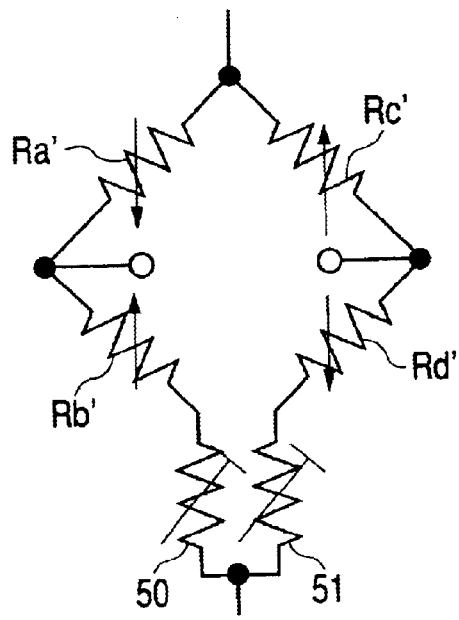
FIGS. 2A and 2B are partial circuit diagrams of prior art bridge structures.
Figure 2B:
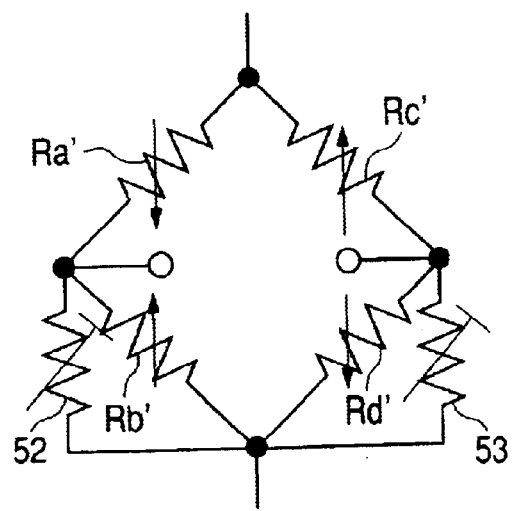

In FIG. 2A, resistors 50 and 51 are added in series with respective half bride portions. In FIG. 2B, resistors 52 and 53 are added in parallel with respective resistors in the bridge. Trimming the added resistors provides offset adjustment in the bridge.

However, the resistors 50 to 53 should be subjected to laser trimming for the above-mentioned adjustment, so that thin film resistors having a temperature coefficient of resistance of almost zero such as CrSi are used as the resistors 50 to 53. Thus, difference in temperature coefficient of resistance between the strain gages and these resistors occurs. Then, if its temperature varies, the zero point of the bridge will deviate from the previous point. That is, the temperature characteristic of the offset should be adjusted independently.

This operation is caused by directly connecting resistors having different TCRs in series. On the other hand, in this embodiment, the zero point of the half bridge portion including the stain gages Ra and Rb is adjusted with either of the strain gages R1 or R2 when no pressure is applied to the strain gages Ra and Rb. That is, the difference between the output voltage V2 of the operational amplifier OP1 and the reference voltage Vref, is adjusted toward zero volt when no pressure is applied to the strain gages Ra and Rb with either of the resistor R2 or R1. More specifically, either of the resistors R1 or R2 is adjusted to equalize the reference voltage Vref to the output voltage V2 by trimming the resistor R1 or R2 having a trimming structure (layer on a surface of a chip) when no pressure is on the diaphragm 10 (no physical quantity). The trimming structure may be trimmed by laser.

Further, the resistors R1 and R2 are of the same type (have the same TCR). This structure prevents deviation of the zero point because resistors having different TCRs are not directly connected in the bridge structure. In addition, it is prevented that the reference voltage Vref varies with temperature variation. Accordingly, if the offset voltage of the operational amplifier OP1 is negligibly low, and the influence by the temperature characteristic of the offset voltage is also negligible, this structure further provides offset temperature characteristic compensation by the above-mentioned offset adjustment with either of the resistors R1 or R2 at a temperature, such as a room temperature.

Figure 9A:
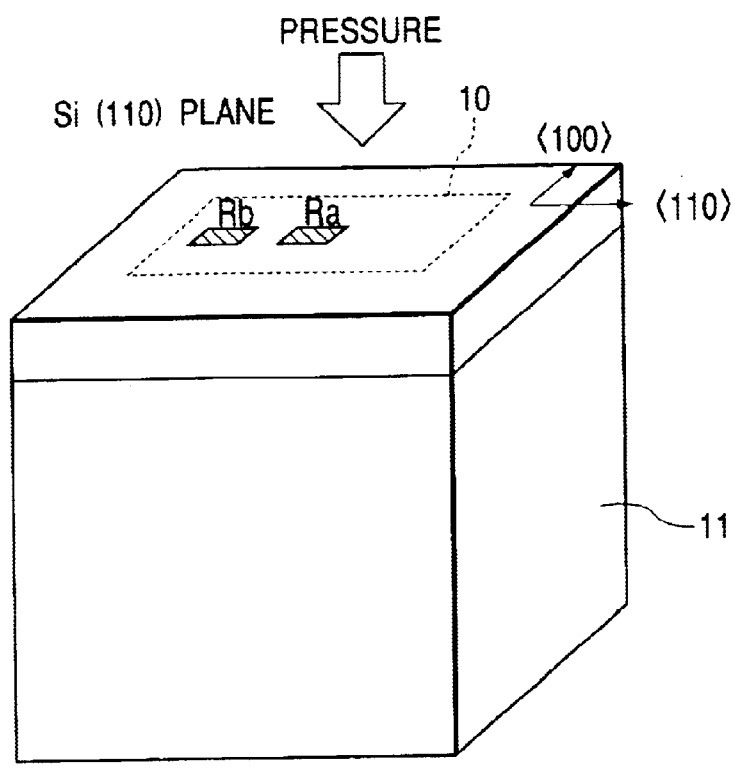
FIG. 9A is a perspective view of a pressure sensor having a chip structure according to this invention.
Figure 9B:
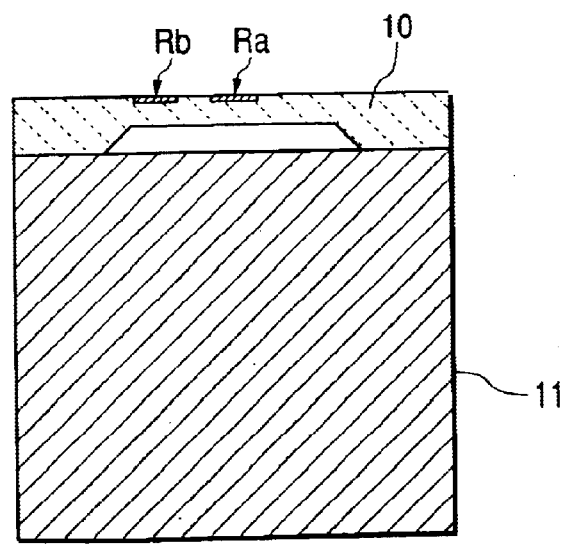
FIG. 9B is a sectional side elevation view of the pressure sensor according to this invention.

The offset and the offset temperature characteristic may be caused by dispersion in the line width of the diffused resistor. However, in fact, the offset and the offset temperature characteristic may be resulted by a cause other than dispersion in line width of the diffused resistors. For example, such an offset and offset temperature characteristic may be caused by thermal stress in a diaphragm 10 in which strain gages are formed. FIG. 9A shows a perspective view of a pressure sensor having a chip structure. FIG. 9B shows a sectional side elevation view of the pressure sensor. In this structure, the thermal stress distribution on the diaphragm 10 in which the strain gages Ra and Rb are formed may be dependent on the linear expansion coefficient or the configuration of a pedestal 11, the shape of the diaphragm 10, the arrangement of the strain gages Ra and Rb, or the chip structure, such as a passivation film. Then, this embodiment provides resistors Rto1, Rto2, R41, and R42 to compensate the offset temperature characteristic due to these causes and the offset temperature characteristic due to the offset voltage of the operational amplifier OP1.

In operation, when the resistances of the diffused resistors Ra and Rb vary in accordance with application of a pressure to the diaphragm 10, the operational amplifier OP1 operates to equalize the middle voltage V1 supplied to the inverting input of the operational amplifier OP1 to the reference voltage Vref, so that the intensity of the current flowing into the inverting input of the operational amplifier OP1 varies with variation in resistance of the resistors Ra and Rb. The operational amplifier OP1 outputs the output voltage V2 such that a current flowing through the feedback resistor Rts cancels this current. Then, the output voltage V2 represents the variation in the variation in the resistances of the resistors Ra and Rb. For example, if the reference voltage Vref is 2.5 V, the operational amplifier OP1 outputs V2 of 2.5 V—tens millivolts.

In this circuit, the feedback resistor Rts comprises a temperature sensitive element, and its temperature coefficient of resistance TCRts is determined as follows:

If it is assumed that the reference voltage Vref is Vcc/2, the output voltage V2 of the operational amplifier OP1 is given by:

$$V2 = Vref + Rts \cdot \left\{ \frac{Vref \cdot Ra - (Vcc - Vref) \cdot Rb}{Ra \cdot Rb} \right\} = \frac{Vcc}{2} \left\{ 1 + \frac{Rts \cdot (Ra - Rb)}{Ra \cdot Rb} \right\} \quad (1)$$

Moreover, if it is assumed that resistances of the resistors Ra and Rb when a pressure is applied thereto are Ra=R−ΔR and Rb=R+ΔR, the output voltage V2 is given by:

$$V2 \approx \frac{Vcc}{2} - Vcc \cdot \frac{Rts}{R} \cdot \frac{\Delta R}{R} \quad (2)$$

The first term of Eq. (2) is Vref=Vcc/2, and the second term includes the pressure signal component. Thus, (V2−Vref) can be regarded as the pressure signal. The second term of Eq. (2) shows that a gage ratio ΔR/R decreases with increase in temperature. On the basis of this fact, the condition for temperature compensation for the output voltage V2 is determined by substituting the partial differentiation of the output voltage V2 with respective to temperature with zero. Then, Eq. (3) is established regarding the temperature coefficient of resistance TCRts of the feedback resistor Rts as follows:

$$TCRts \approx TCR - TCS \quad (3)$$

where TCR is a temperature coefficient of resistance of diffused resistors Ra and Rb, and TCS is a temperature coefficient of sensitivity of the diffused resistors Ra and Rb. Moreover, the temperature coefficient of resistance TCRts of the feedback resistor Rts, the temperature coefficient of resistance TCR of the diffused resistors Ra and Rb, and the temperature coefficient of sensitivity TCS are represented by:

$$TCRts = \frac{1}{Rts} \times \frac{\partial Rts}{\partial T} \quad (4)$$

$$TCR = \frac{1}{R} \times \frac{\partial R}{\partial T} \quad (5)$$

$$TCS = \frac{R}{\Delta R} \times \frac{\partial \left( \frac{\Delta R}{R} \right)}{\partial T} \quad (6)$$

During obtaining of Eq. (3), $(\Delta R/R)^2$ is neglected because ΔR/R=0.002 to 0.02, i.e., $(\Delta R/R)^2 \ll 1$. From the above-mentioned relations, it is found that if the temperature coefficient of resistance TCR of the feedback resistor Rts satisfies Eq. (3), the temperature characteristic of sensitivity can be compensated.

On the other hand, the offset and offset temperature characteristic compensation circuit 2 includes an operational amplifier OP2, a resistor R3 connected between the inverting input of the operational amplifier OP2 and the output of the operational amplifier OP1, and a feedback resistor R6 connected between the inverting input and the output terminal of the operational amplifier OP2 of which non-inverting input is supplied with the reference voltage Vref.

In this circuit, the output of the operational amplifier OP1 is supplied to the inverting input of the operational amplifier OP2 through the resistor R3 and amplified with inversion to generate the sensor output at an output terminal Vout. That is, if it is assumed that the difference voltage between the output voltage V2 and the reference voltage Vref is represented by $Vcc \cdot Rts \cdot \Delta R/R^2$, the operational amplifier OP2 amplifies this difference voltage at ratio of R6/R3. Here, if resistors R41, R42, Rto1, Rto2, R5, R5' mentioned later are removed, and if it is assumed that the output of the operational amplifier OP1 is 2.5—tens millivolts, the voltage of the output terminal Vout becomes 2.5 V+A×(tens millivolts). "A" represents the gain of the operational amplifier OP2. From this, the output voltage Vout increases with increase in pressure.

As mentioned above, the output V2 of the operational amplifier OP1 varies around the reference voltage of 2.5 V. That is, the output voltage V2 does not go to levels near 0 V. Thus, the operational amplifier OP1 is not subjected to limitation of $|Vce(sat)| \approx 0.2$ V to the output transistor in the operational amplifier OP 2. Then, if the pressure is zero, the operational amplifier OP2 can output accurately.

Figure 12:
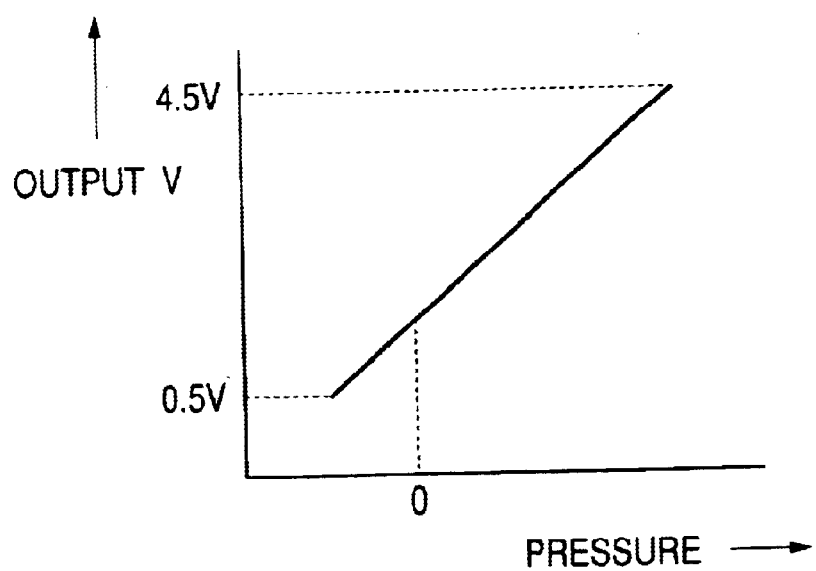
FIG. 12 is a graphical drawing illustrating an output voltage variation according to the present invention.
Figure 8:
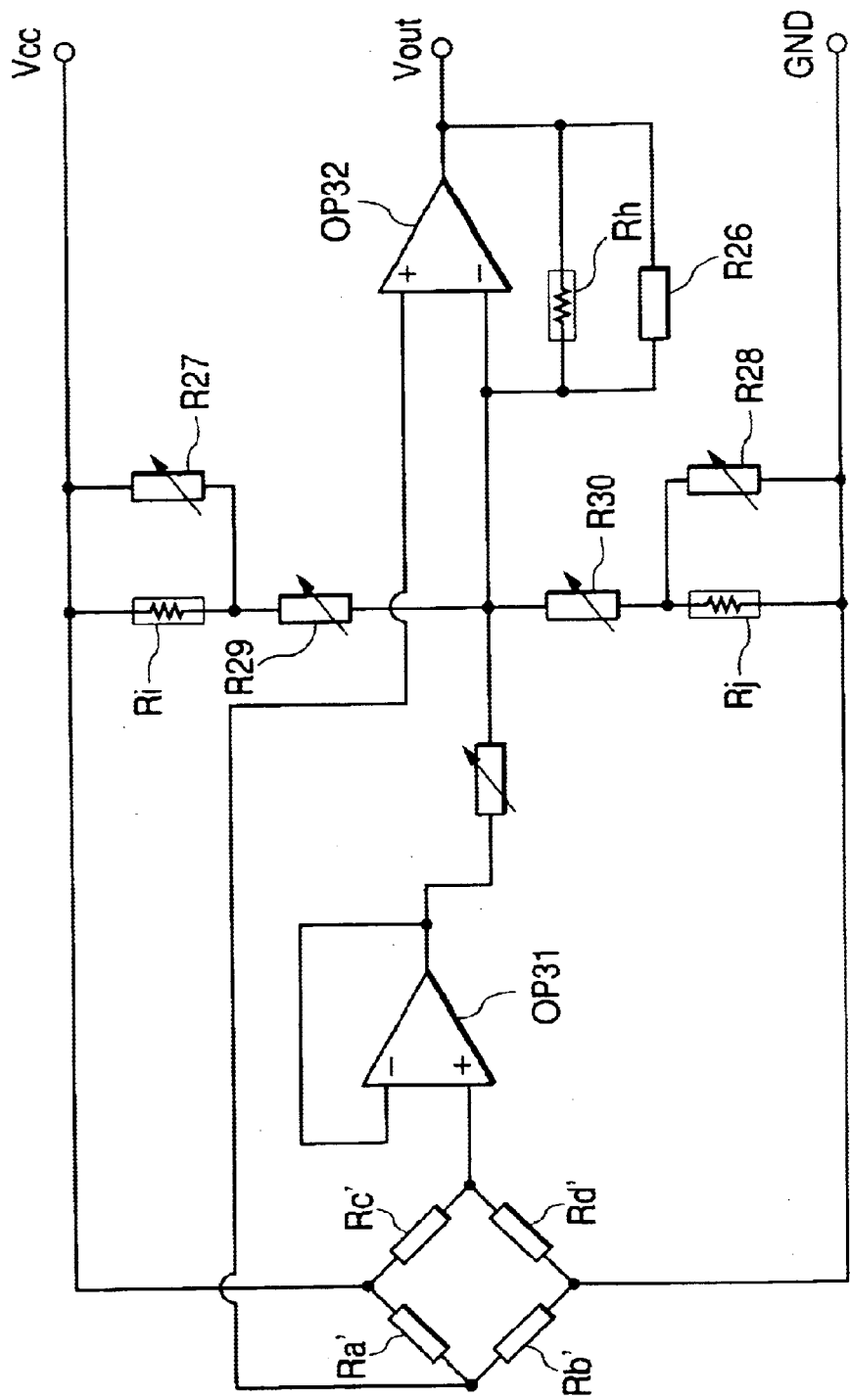
FIG. 8 is a schematic circuit diagram of a still another prior art physical quantity detection device.

However, if the general voltage range of the pressure sensor is 0.5 to 4.5 V, it is required that the output voltage should be outputted from 0.5 V. For this, a resistor R5 is provided between the supply voltage Vcc and the inverting input of the operational amplifier OP2 to flow a current from the supply voltage Vcc through the resistor R5 toward the feedback resistor R6 for the operational amplifier OP2 to shift the output voltage of the operational amplifier OP2 to provide offset adjustment at the final stage. Then, the output voltage Vout increases with increase in pressure as shown in FIG. 12.

The offset and offset temperature characteristic compensation circuit 2 further includes a resistor R41 and a resistor Rto1 connected between the supply voltage Vcc (first reference potential) and the inverting input of the operational amplifier OP2, and a resistor Rto2 and R42 are connected between the inverting input of the operational amplifier OP2 and the ground (second reference potential). The resistors Rto1 and Rto2 among them have temperature characteristics of resistance (temperature dependency of resistance).

These resistors R41, R42, Rto1, and Rto2 are used for offset temperature characteristic compensation. For example, trimming the resistor R42 loses balance between the resistors R41 and R42. This enables adjustment of the offset temperature characteristic. That is, when respective resistors are balanced with each other, all of the current flowing through the resistor R41 and the resistor Rto1 flows into the resistor R42 and the resistor Rto2 as it is because the reference voltage Vref is set to Vcc/2. Thus, losing the balance makes the current corresponding to the difference flow into the feedback resistor R6 of the operational amplifier OP2. Here, the resistors Rto1 and Rto2 have a temperature characteristic of resistance, which enables compensation of the offset temperature characteristic. During this operation, the amount of trimming with the resistor R42 can be monitored at a terminal V5.

As mentioned above, in the operational amplifier OP1 of the sensitivity temperature characteristic compensation circuit 1, the reference voltage Vref is not set to a voltage around 0 V but set to the middle voltage of the supply voltage Vcc. Thus, when no pressure is applied to the pressure sensor, the pressure sensor accurately generates its output voltage.

Moreover, in the offset and offset temperature characteristic compensation circuit 2, the non-inverted input of the operational amplifier OP2 is supplied with the reference voltage Vref=Vcc/2 which is the same as that for the operational amplifier OP1.

Moreover, the resistors Ra and Rb have the same resistance, the middle voltage V1 is Vcc/2, and the reference voltage Vref is Vcc/2 also, so that when no pressure is applied to the diaphragm 10, all of (almost all of) the current flowing through the resistor Ra flows into the resistor Rb. This structure is favorable to the operational amplifer OP2 because saturation in the operational amplifier OP2 is prevented. More specifically, if the difference in intensity of current between the resistors Ra and Rb is large when no pressure, and if the reference voltage Vref is not commonly used, the operational amplifier OP2 may be saturated.

In the circuit of the pressure sensor, there are trimming resistors including the resistor R3 for sensitivity adjustment, the resistor R5 for offset adjustment, the resistors R41 and R42 for offset temperature characteristic adjustment. Here, the type of the feedback resistor R6 is the same as that of these trimming resistors. For example, a thin film resistor having a TCR of almost zero is used.

In the combination of the resistor R3 for trimming sensitivity and the feedback resistor R6, the temperature characteristics are cancelled each other at the ratio of their resistances because their TCRs are equal to each other. This structure eliminates a temperature characteristic in the sensitivity adjustment.

In the offset adjustment, because the reference voltage Vref includes no pressure signal and has no temperature dependency, the resistor R5 for offset adjustment can independently adjust the offset. In the offset temperature characteristic adjustment, the resistors R41 and R42 are trimmed. During this adjustment, not only the offset temperature characteristic but the offset voltage varies. Therefore, the offset adjustment is done after the offset temperature characteristic adjustment. That is, the offset adjustment provides no influence to the offset temperature characteristic adjustment. In other words, these adjustments can be done independently.

As mentioned above, in this circuit structure, the sensitivity adjustment, the offset temperature characteristic adjustment, the offset adjustment are independent. This provides an accurate and easy adjustment.

For reference, equations for the output voltage V2 will be shown.

$$Vout = Vref + R6 \cdot \left( \frac{Vref}{Rto2 + R42} - \frac{Vcc - Vref}{Rto1 + R41} - \frac{Vcc - Vref}{R5} - \frac{V2 - Vref}{R3} \right) \quad (7)$$

Here, substitution of $Vref=Vcc/2$ and $V2-Vref=-Vcc \cdot Rts \cdot \Delta R/R^2$ are made.

$$Vout = \frac{Vcc}{2} \cdot \left(1 + \frac{R6}{Rto2 + R42} - \frac{R6}{Rto1 + R41} - \frac{R6}{R5}\right) + Vcc \cdot \frac{R6}{R3} \cdot \frac{Rts}{R} \cdot \frac{\Delta R}{R} \quad (8)$$

In Eq. (8), it is found that only the second term relates to the pressure signal because only $\Delta R$ is dependent on the pressure and that the first term relates to the offset and offset temperature characteristic. This fact also proves that these adjustments can be done independently.

If this pressure sensor is used for detecting a negative pressure, the resistor R5 is adjusted to equalize the possible low pressure to the lowest level in the output voltage range of the operational amplifer OP2 (for example, 0.5V) to shift the output of the operational amplifier OP2. This structure can output the pressure detection signal representing a negative pressure.

If it is desired that the operational amplifier OP2 outputs the pressure detection signal increasing from 2.5 V when a positive pressure is applied and decreasing from 2.5 V when a negative pressure is applied, that is, the pressure detection signal varies around the reference voltage Vref, addition of a resistor R5' provides this operation. Moreover, according to circumstances, the resistor R5 can be removed.

Second Embodiment

The circuit structure according to the second embodiment is the same as that shown in FIG. 1. The difference is in the structure of the diffused resistors. The second embodiment is provided to improve non-linearity in the sensitivity temperature characteristic.

The non-linearity in the sensitivity temperature characteristic means that, for example, if the sensitivity is compensated at a room temperature and a high temperature, an error in the sensitivity increases at a low temperature.

The resistor temperature characteristic including non-linearity in a P type of diffused resistor (piezoresistance element) including boron (B) and a temperature characteristic of piezoresistance effect are disclosed in "Nonlinear Temperature Characteristics in Silicon Piezoresistive Pressure Sensors" in Proceedings of the $5^{th}$ Sensor Symposium May 30 and 31, 1985, and are represented as follows:

$$R(T) = R0 \cdot (1 + \alpha1 \cdot T + \alpha2 \cdot T^2) \quad (9)$$

$$S(T) = S0 \cdot (1 + \beta1 \cdot T + \beta2 \cdot T^2) \quad (10)$$

where R(T) represents resistance of the diffused resistor, and S(T) represents the sensitivity of the piezoresistance effect. T represents a temperature difference between its temperature and the reference temperature (in FIG. 3, at a room temperature of 25° C.). R0 and S0 represent the resistance and the sensitivity at the reference temperature, respectively. $\alpha1$, $\alpha2$, $\beta1$, and $\beta2$ are temperature coefficients. Moreover, S(T) and S0 are considered as the above-mentioned $\Delta R/R$.

These temperature coefficients in Eqs. (9) and (10) are dependent on concentrations of impurity in the diffused resistors, and the measured values are shown in FIGS. 3A to 3D.

On the basis of the data, the inventor provided approximate expressions from approximate curves $y = C_0 + C_1 \cdot (\log x) + C_2 \cdot (\log x)^2 + C_3 \cdot (\log x)^3$ (where, Ci are coefficients). Then, the inventor acquired the condition for minimizing the non-linearity in the sensitivity temperature characteristic in the circuit structure shown in FIG. 1 through simulation. This provided the results shown in FIGS. 4A and 4B. The result shows that the non-linearity is minimum when the concentration of impurity of the diffused resistors Ra and Rb are about $1.2 \times 10^{19}$ $cm^{-3}$ and the concentration of impurity of the feedback resistor Rts is about $3.6 \times 10^{17}$ $cm^{-3}$.

Figure 4A:
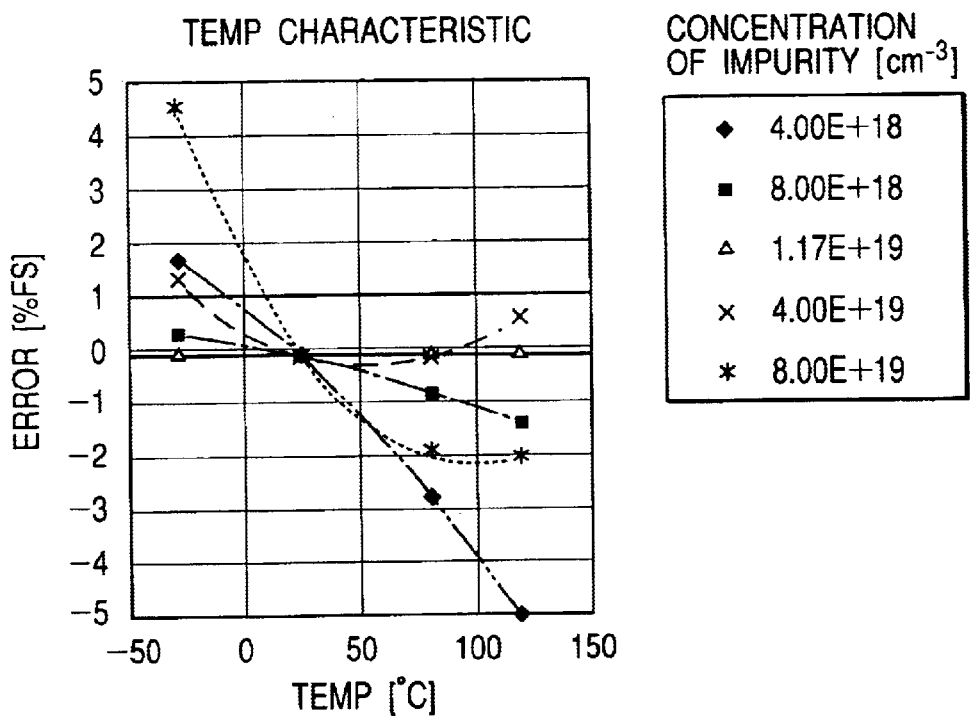
FIGS. 4A and 4B are graphical drawings illustrating temperature characteristics with respect to concentration of impurity according to a second embodiment of the present invention.
Figure 4B:
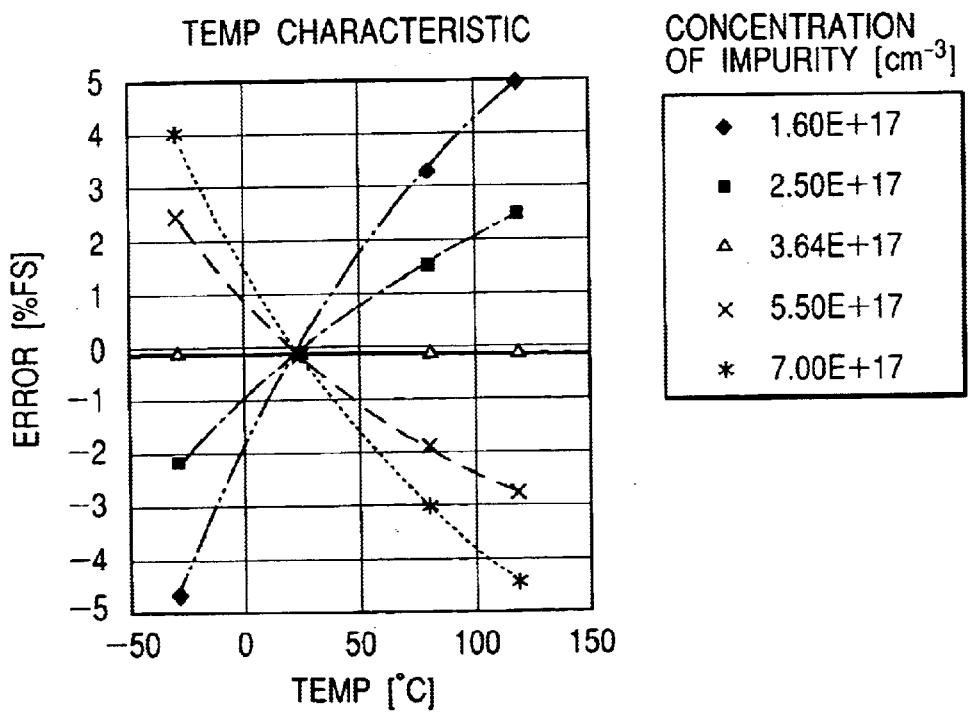
Figure 5:
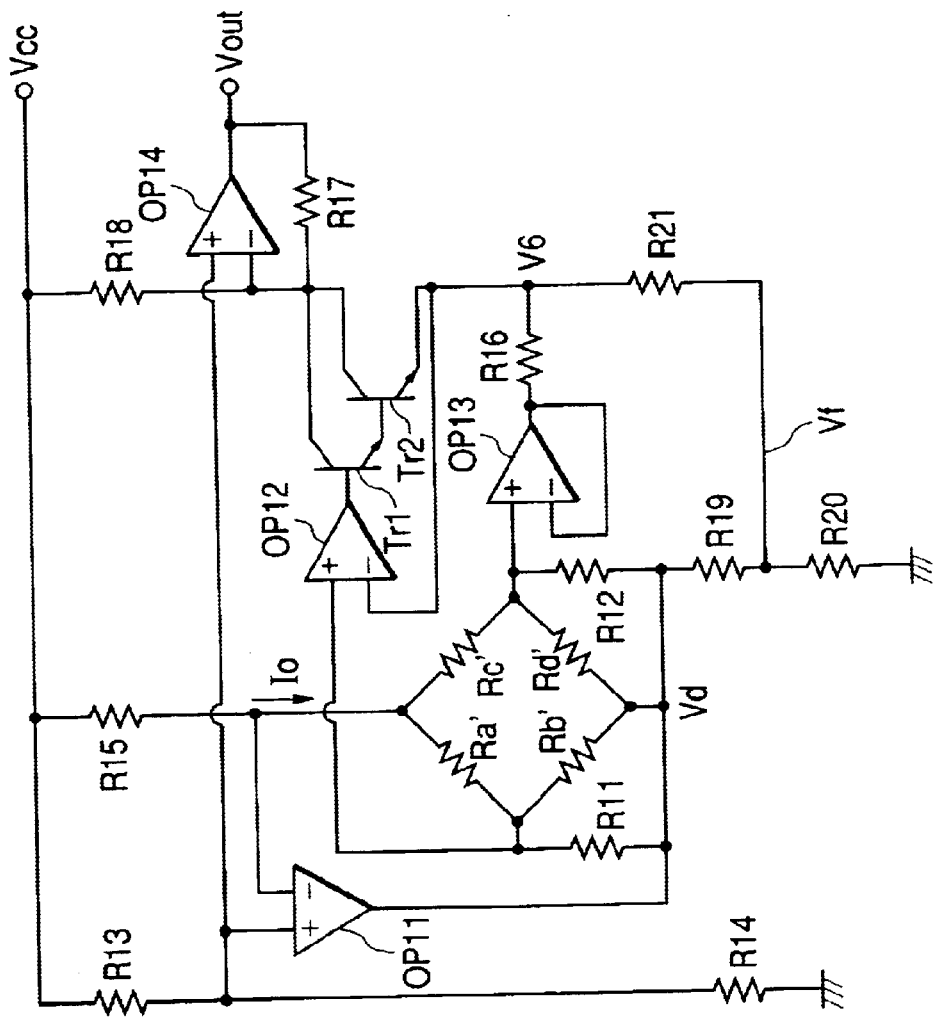
FIG. 5 is a schematic circuit diagram of a prior art physical quantity detection device.
Figure 6:
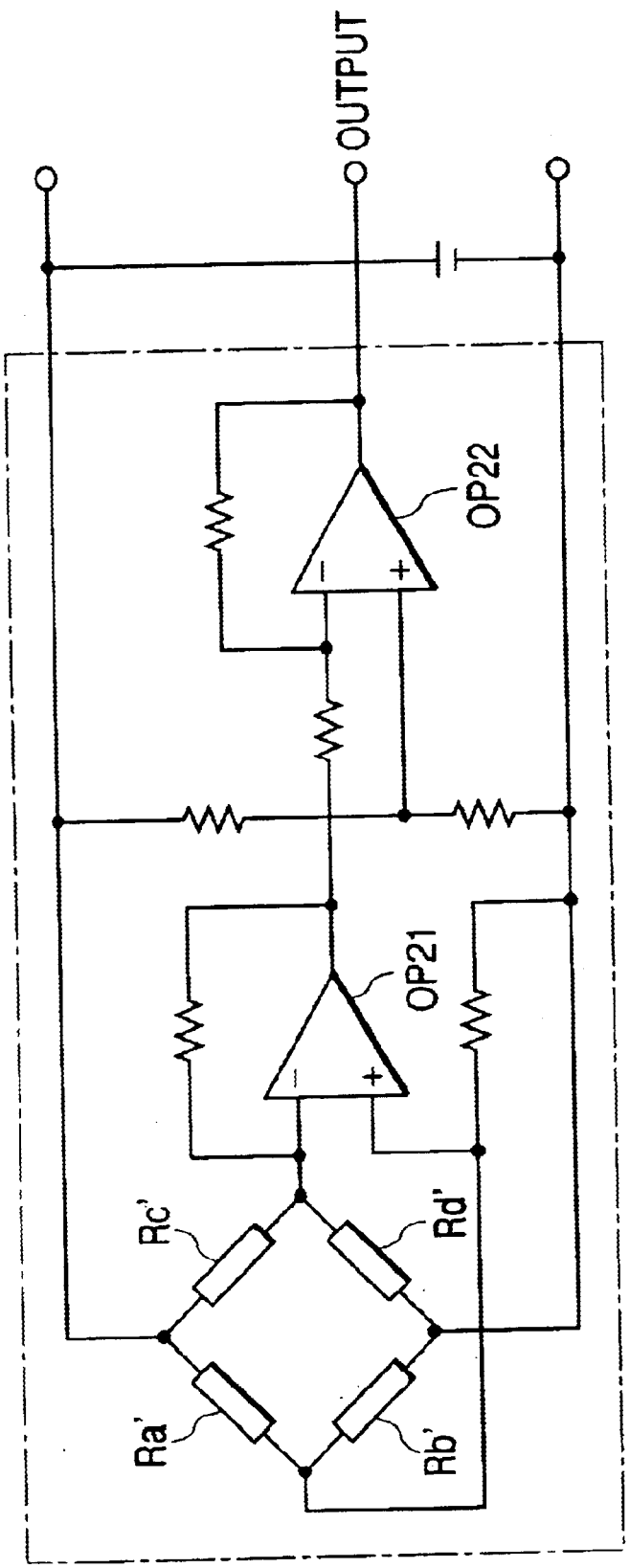
FIG. 6 is a schematic circuit diagram of another prior art physical quantity detection device.
Figure 7:
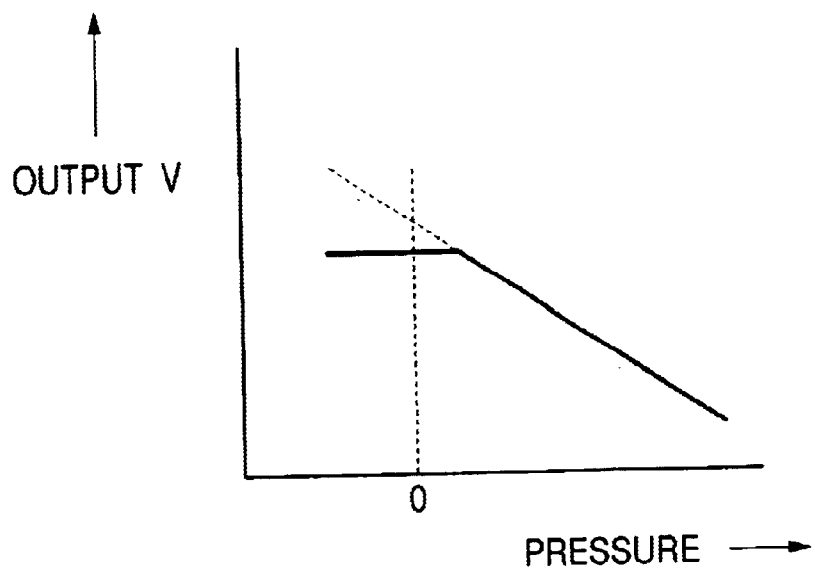
FIG. 7 is a graphical drawing illustrating an output characteristic according to the prior art physical quantity detection device shown in FIG. 6.

This condition provides the optimal non-linearity over a wide temperature range from −30° C. to 120° C. On the other hand, there are various usable conditions for more simple use. More specifically, the required temperature range may be narrower. In this case, if an error in non-linearity is allowed up to 2% from 0° C. to 50° C., as shown in FIGS. 4A and 4B, the concentrations of impurity of the diffused resistors Ra and Rb are from $0.4 \times 10^{19}$ $cm^{-3}$ to $8 \times 10^{19}$ $cm^{-3}$ and the concentration of impurity of the feedback resistor Rts is from $1.6 \times 10^{17}$ $cm^{-3}$ to $7 \times 10^{17}$ $cm^{-3}$. Similarly, if an error in non-linearity is allowed up to 1% from 0° C. to 50° C., as shown in FIGS. 4A and 4B, the concentrations of impurity of the diffused resistors Ra and Rb are from $0.8 \times 10^{19}$ $cm^{-3}$ to $4 \times 10^{19}$ $cm^{-3}$ and the concentration of impurity of the feedback resistor Rts is from $2.5 \times 10^{17}$ $cm^{-3}$ to $5.5 \times 10^{17}$ $cm^{-3}$. Moreover, there is another optimal condition. That is, the concentrations of impurity of the diffused resistors Ra and Rb are about $1 \times 10^{19}$ $cm^{-3}$, and the concentration of impurity of the feedback resistor Rts is about $4 \times 10^{17}$ $cm^{-3}$.

As mentioned above, in this embodiment, the concentration of impurity of the diffused resistors Ra and Rb is different from that of the feedback resistor Rts. Moreover, the concentrations of impurity of the diffused resistors Ra and Rb and the feedback resistor Rts are made to have the above-mentioned optimal values. In this condition, over a wide temperature range from −30° to 120°, the error in the calculated sensitivity is equal to or smaller than ±0.1%.

This optimal condition can be obtained in another way. The output V2 of the sensitivity temperature characteristic compensation circuit 1 is represented using Eqs. (2), (7), and (8) as follows:

$$V2 = Vcc \cdot \left\{ \frac{1}{2} - \frac{Rts0 \cdot (1 + A1 \cdot T + A2 \cdot T^2)}{R0 \cdot (1 + \alpha1 \cdot T + \alpha2 \cdot T^2)} \cdot S0 \cdot (1 + \beta1 \cdot T + \beta2 \cdot T^2) \right\} \quad (11)$$

where the temperature coefficients of Rts0 are assumed as A1 and A2 to discriminate them from the coefficients $\alpha1$ and $\alpha2$ of the resistors Ra and Rb. This equation is subjected to partial differential with the temperature difference T from the reference temperature. Moreover, neglecting terms including small figures provides the following equation finally.

$$\frac{\partial V2}{\partial T} \approx \frac{Rts0}{R0} \cdot S0 \cdot \frac{(A1 + \beta1 - \alpha1) + 2 \cdot (A1 \cdot \beta1 + A2 + \beta2 - \alpha2) \cdot T}{(1 + \alpha1 \cdot T + \alpha2 \cdot T^2)^2} \quad (12)$$

The possible condition of the temperature compensation is that this equation has a value of zero, so that the following equation is provided:

$$A1 = \alpha1 - \beta1 \quad (13)$$

$$A2 = \alpha2 - \beta2 - \beta1 \cdot (\alpha1 - \beta1) \quad (14)$$

These equations are simultaneous equations, wherein respective left sides are represented by coefficients of resistance Rts and the right sides are represented by coefficients of resistance Ra and Rb.

Figure 10:
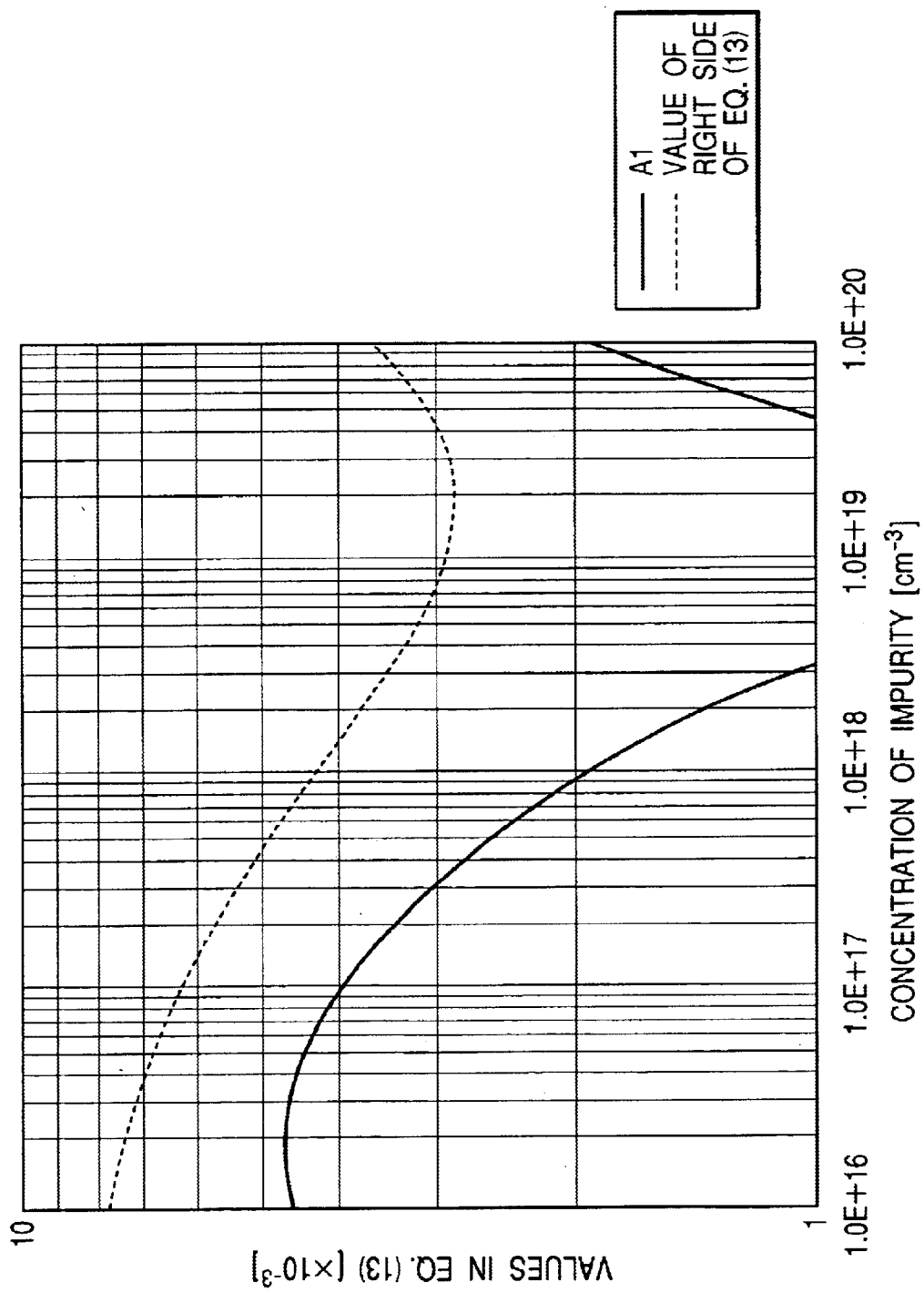
FIG. 10 is a graphical drawing illustrating a relation of temperature coefficients according to the second embodiment.
Figure 11:
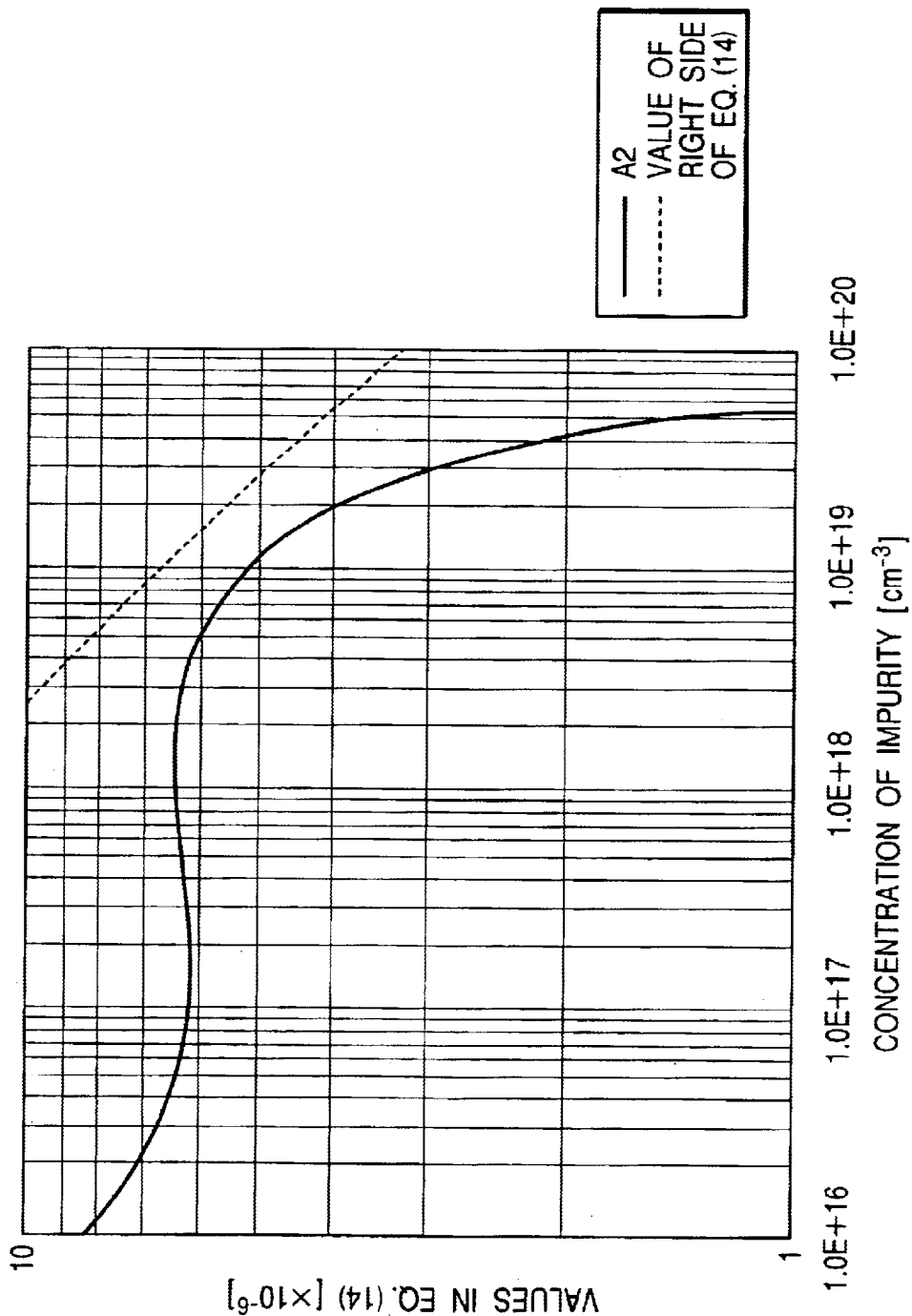
FIG. 11 is a graphical drawing illustrating a relation of temperature coefficients according to the second embodiment.

FIGS. 10 and 11 represent theses relations. That is, FIG. 10 represents A1 in the left side and the condition of the right side of Eq. (13). FIG. 11 represents A2 in the right side and the condition of the right side of Eq. (14). These graphs are obtained on the basis of the approximate curves in FIGS. 3A to 3D.

More specifically, if it is assumed that a sensitivity of the sensing element at a reference temperature is S0, a resistance of the sensing element at the reference temperature is R0, and a resistance of the feedback resistor at the reference temperature is Rts0, then, it is represented that the sensitivity of the sensing element at a temperature t which is different from the reference temperature by T is S(T), the resistance of the sensing element at t is R(T), and the resistance of the feedback resistor at t is Rts(T). S(T), R(T), and Rts are further represented by:

$$S(T)=S0 \cdot (1+\beta 1 \cdot T+\beta 2 \cdot T^2), R(T)=R0 \cdot (1+\alpha 1 \cdot T+\alpha 2 \cdot T^2), \text{ and } Rts(T)=Rts0 \cdot (1+A1 \cdot T+A2 \cdot T^2),$$

where $\alpha 1$, $\alpha 2$, $\beta 1$, $\beta 2$, A1, and A2 are temperature coefficients, and wherein the $\alpha 1$, $\alpha 2$, $\beta 1$, $\beta 2$, A1, and A2 are determined so as to establish both $A1=\alpha 1-\beta 1$ and $A2=\alpha 2-\beta 2-\beta 1 \cdot (\alpha 1-\beta 1)$.

With FIGS. 10 and 11, the concentration of impurity satisfying Eqs. (13) and (14) can be obtained. Because Eqs. (13) and (14) should be established instantaneously, the number of combination is one. Accordingly, this condition is established when the concentrations of the diffused resistors Ra and Rb are about $1.5 \times 10^{19}$ cm$^{-3}$, and the concentration of impurity of the feedback resistor Rts is about $3.6 \times 10^{17}$ cm$^{-3}$. That is, in the range of concentration of impurity from $10^{16}$ cm$^{-3}$ to $10^{20}$ cm$^{-3}$, only this combination provides the optimal condition. However, in addition to the concentration of impurity, the sensitivity temperature characteristic may deviate by other causes such as affection of passivation of the chip or heat stress from the base, so that it is desirable to adjust the sensitivity temperature characteristic to obtain its optimal condition every type of pressure sensor through experiments with that the concentrations of impurity are shifted around the above optimal condition.

The above-mentioned condition of concentration of impurity approximately agrees with the result of the above-mentioned simulation. Moreover, Eq.(13) corresponds approximately to Eq. (3).

Regarding this, in Japanese patent Ser. No. 3-67211, the concentration of impurity of the resistors Ra to Rd is $1.5 \times 10^{19}$ cm$^{-3}$ and the concentration of impurity of the feedback resistor is $1.5 \times 10^{18}$ cm$^{-3}$. In this condition, the sensitivity temperature characteristic is 0.05%/° C. from −30° C. to 110° C., that is, the error in the sensitivity was 7% (this is approximately introduced from the values in this document). However, the usable temperature range for the pressure sensors have been expanded recently. In addition, the accuracy including other errors is required to be lower than ±1–2%. This example is insufficient in these requirements.

Moreover, in the example disclosed in Japanese patent No. 2976487, the concentration of impurity of the diffused resistors are about $10^{20}$ cm$^{-3}$. With reference to FIGS. 3A to 3D, this condition satisfies the condition that the sum of first order coefficients is equal to zero ($\alpha 1+\beta 1=1.8 \times 10^{-3}+(-1.8 \times 10^{-3})=0$). This means that the sensitivity decreases with increase in temperature ($\beta 1<0$), but if a constant current is supplied to this circuit, the applied voltage increases substantially because the resistances increase ($\alpha 1>0$), so that if $\alpha 1=-\beta 1$, the temperature compensation is provided.

On the other hand, because the sum of second order coefficients is not zero, ($\alpha 2+\beta 2 \neq 0$), there is theoretically non-linearity in the sensitivity temperature characteristic. In this case, the error in sensitivity is about 0.5% at a range from −30° C. to 120° C.

Moreover, in this case, with reference to FIG. 3, the sum of the first order coefficients ($\alpha 1+\beta 1$) is almost zero also at concentration of impurity of the diffused resistors of about $10^{18}$ cm$^{-3}$. However, the sum of second order coefficients ($\alpha 2+\beta 2$) becomes larger than that in the case of the concentration of impurity of the diffused resistors is $10^{20}$ cm$^{-3}$.

As mentioned above, in the above-mentioned prior arts, suppressing the non-linearity in the sensitivity temperature characteristic was impossible. On the other hand, using resistors, i.e., feedback resistor Rts and diffused resistors Ra and Rb, having two different concentrations of impurity provides almost zero temperature characteristic of sensitivity without non-linearity.

In the first embodiment, only the feedback resistor Rts was described for the operational amplifier OP1. However, a resistor Rts' may be connected in parallel with the feedback resistor Rts to change the combined resistance to adjust the temperature characteristic of sensitivity. That is, in the actual production, there are cases that the temperature characteristic of sensitivity slightly deviates when the thickness of a diaphragm is considerably changed. Then, the concentration of impurity of the feedback resistor Rts is maintained, and adjustment of the resistor Rts' formed with CrSi film resistor provides fine adjustment of the sensitivity temperature characteristic. That is, the resistor Rts' has a trimming structure (layer on a surface of a chip). The trimming structure may be trimmed by laser.

Figure 3A:
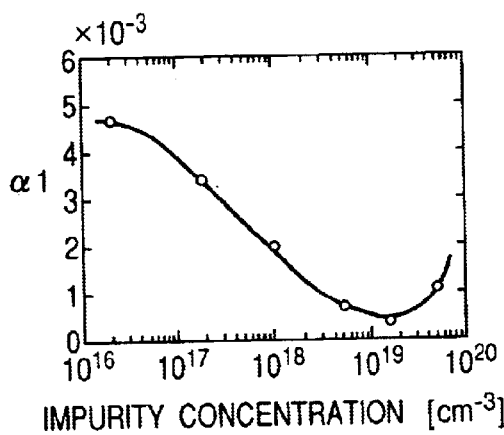
FIGS. 3A to 3D are graphical drawings illustrating prior art relation between temperature coefficients and concentration of impurity.
Figure 3B:
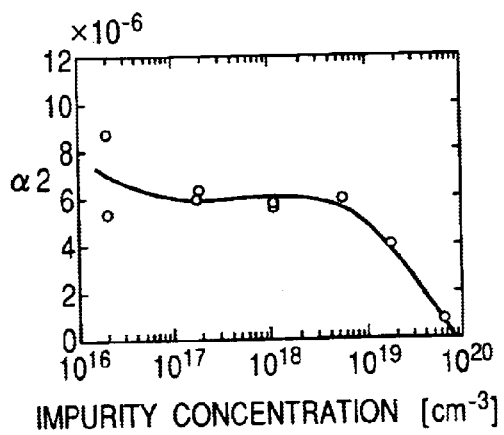
Figure 3C:
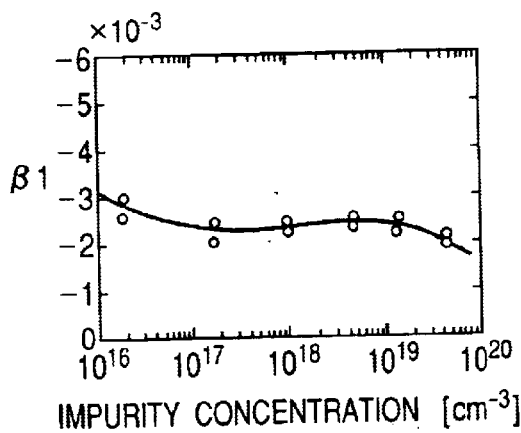
Figure 3D:
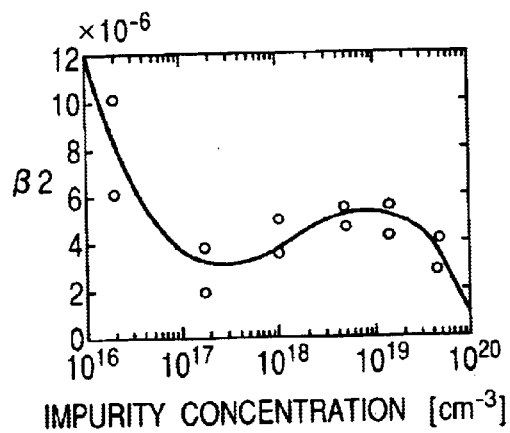

Moreover, if the resistors Rto1 and Rto2 are provided with diffused resistors, the conditions provided by Eq. (9) and FIGS. 3A and 3B are applicable to these resistors.

Modifications

In the above-mentioned embodiments, both diffused resistors Ra and Rb comprise strain gages. However, another pressure sensor can be provided. This pressure sensor includes the diffused resistor Ra as the strain gage and the resistor Rb which may be formed as a resistor other than the strain gage having the same temperature coefficient of resistance TCR as that of the diffused resistor Ra. More specifically, for example, only the diffused resistor Ra is formed in the diaphragm, and the diffused resistor Rb is formed at a place other than the diaphragm 10.

Moreover, the concepts of the first and second embodiments, Eqs. (3), (9), (13), (14), and data in FIGS. 3A to 3D are applicable other physical quantity detection device for detecting a physical quantity by detecting variation in resistances.

At last, points of production and the circuit design will be described. This invention relates to the temperature compensation circuit, so that it is necessary to pay attention to evenness of temperature in the circuit.

Regarding the sensitivity temperature compensation, the feedback resistor provides the sensitivity temperature compensation of the sensing element, so that it is assumed that they are at the same temperature. That is, temperatures of these two types of resistors should be equalized as much as possible. For example, if the sensor is of a semiconductor sensor, it is favorable that they are formed closely to each other within the same chip. Moreover, because it is assumed that the feedback resistor is not influenced by stress, it is desirable that the feedback resistor is located at a region where is free from stress by physical quantity to be detected such as a pressure.

Moreover, it is desirable that the resistor is formed to direct its longitudinal side (current direction) to a direction (100) in which piezoresistance effect occurs.

Moreover, the offset temperature is compensated with the temperature characteristic of the resistors Rto1 and Rto2. Because the errors in the offset temperature characteristic are caused by dispersions of diffused resistors Ra and Rb, and offset voltage of the operational amplifiers OP1 and OP2, it is desirable that the resistors Rto1, Rto2, Ra, Rb, and operational amplifiers OP1 and OP2 are formed within the same chip.

Moreover, as understood from Eq. (2), the operational amplifier OP1 generates the output voltage V2 of which intensity is proportional to the ratio Rts/R between the resistance of the feedback resistor Rts in the sensitivity temperature characteristic compensation circuit 1 and the resistance R of the sensing elements. This structure can suppress the gain of the offset and offset temperature characteristic compensation circuit 2. This reduces the influence by the offset voltage of the operational amplifier OP2 to the output Vout. However, regarding this, in the second embodiment, if the concentration of impurity of the feedback resistor is made too low, for example, about $3.6 \times 10^{17}$ $cm^{-3}$, and if a larger signal is obtained at V2, the width of depletion layer in the feedback resistor provided by reverse bias for isolation will vary considerably. This may cause non-linearity in the output signal. This point should be considered.

What is claimed is:

1. A physical quantity detection device comprising:
   an operational amplifier;
   a first resistor connected between an inverting input of said operational amplifier and a first reference potential;
   a second resistor connected between said inverting input of said operational amplifier and a second reference potential, said first and second resistors having a first temperature coefficient of resistance;
   a feedback resistor being connected between said inverting input of said operational amplifier and an output of said operational amplifier and having a second temperature coefficient of resistance; and
   a reference voltage generation circuit generating a reference voltage supplied to a non-inverting input of said operational amplifier, at least one of said first and second resistors comprising a sensing element of which resistance varies on the basis of a physical quantity with a temperature coefficient of sensitivity, wherein a difference between said first temperature coefficient of resistance and said temperature coefficient of sensitivity is substantially equal to said second temperature coefficient of resistance, and wherein said reference voltage generation circuit sets said reference voltage to a middle potential between said first potential and said second reference potential.

2. The physical quantity detection device as claimed in claim 1, wherein each of said first and second resistors and said feedback resistor comprises a diffused resistor and a concentration of impurity of said feedback resistor is different from concentrations of impurity of said first and second resistors.

3. The physical quantity detection device as claimed in claim 2, wherein said concentrations of impurity of said first and second resistors are from $0.4 \times 10^{19}$ $cm^{-3}$ to $8 \times 10^{19}$ $cm^{-3}$ and concentration of impurity of said feedback resistor is from $1.6 \times 10^{17}$ $cm^{-3}$ to $7 \times 10^{17}$ $cm^{-3}$.

4. The physical quantity detection device as claimed in claim 3, wherein said concentrations of impurity of said first and second resistors are from $0.8 \times 10^{19}$ $cm^{-3}$ to $4 \times 10^{19}$ $cm^{-3}$ and said concentration of impurity of said feedback resistor is from $2.5 \times 10^{17}$ $cm^{-3}$ to $5.5 \times 10^{17}$ $cm^{-3}$.

5. The physical quantity detection device as claimed in claim 4, wherein said concentrations of impurity of said first and second resistors are about $1 \times 10^{19}$ $cm^{-3}$, and said concentration of impurity of said feedback resistor is about $4 \times 10^{17}$ $cm^{-3}$.

6. The physical quantity detection device as claimed in claim 1, wherein one of said first and second resistors comprises said sensing element of which resistance varies on the basis of said physical quantity, and a resistance of the other of said first and second resistors remains constant with respect to said physical quantity.

7. The physical quantity detection device as claimed in claim 1, wherein one of said third and fourth resistors has a trimming structure to trim reference voltage toward an output voltage of said operational amplifier on when said physical quantity is zero.

8. The physical quantity detection device as claimed in claim 1, wherein said reference voltage is determined such that said almost all of a current flowing through said first resistor flows into said second resistor.

9. A physical quantity detection device comprising:
   an operational amplifier;
   a first resistor connected between an inverting input of said operational amplifier and a first reference potential;
   a second resistor connected between said inverting input of said operational amplifier and a second reference potential, said first and second resistors having a first temperature coefficient of resistance;
   a first feedback resistor being connected between said inverting input of said operational amplifier and an output of said operational amplifier and having a second temperature coefficient of resistance;
   a second feedback resistor having a trimming structure connected in parallel with said first feedback resistor; and
   a reference voltage generation circuit generating a reference voltage supplied to a non-inverting input of said operational amplifier, at least one of said first and second resistors comprising a sensing element of which resistance varies on the basis of a physical quantity with a temperature coefficient of sensitivity, wherein a difference between said first temperature coefficient of resistance and said temperature coefficient of sensitivity is substantially equal to said second temperature coefficient of resistance, and wherein said reference voltage generation circuit sets said reference voltage to a middle potential between said first potential and said second reference potential.

10. A physical quantity detection device comprising:
    an operational amplifier;
    a first resistor connected between an inverting input of said operational amplifier and a first reference potential;
    a second resistor connected between said inverting input of said operational amplifier and a second reference potential, said first and second resistors having a first temperature coefficient of resistance;
    a feedback resistor being connected between said inverting input of said operational amplifier and an output of said operational amplifier and having a second temperature coefficient of resistance;
    a reference voltage generation circuit generating a reference voltage supplied to a non-inverting input of said operational amplifier;

a third resistor;

another operational amplifier having an inverting input supplied with an output of said operational amplifier through said third resistor, a non-inverting input of said another operational amplifier being supplied with said reference voltage; and a fourth resistor disposed between an output terminal and inverting input of said another operational amplifier, at least one of said first and second resistors comprising a sensing element of which resistance varies on the basis of a physical quantity with a temperature coefficient of sensitivity, wherein a difference between said first temperature coefficient of resistance and said temperature coefficient of sensitivity is substantially equal to said second temperature coefficient of resistance, and wherein said reference voltage generation circuit includes first and second voltage dividing resistors connected in series between said first and second reference potentials to generate a divided voltage as said reference voltage.

11. The physical quantity detection device as claimed in claim 10, further comprising an offset trimming resistor between said first reference potential and said inverting input of said another operational amplifier.

12. The physical quantity detection device as claimed in claim 10, further comprising an offset trimming resistor between said second reference potential and said inverting input of said another operational amplifier.

13. The physical quantity detection device as claimed in claim 10, further comprising:

fifth and sixth resistors connected between said first reference potential and said inverting input of said second operational amplifier;

seventh and eighth resistors connected between said inverting input of said another operational amplifier and said second reference potential, wherein said sixth and seventh resistors have temperature dependencies of resistance.

14. The physical quantity detection device as claimed in claim 13, wherein at least one of said fifth and eighth resistors has a trimming structure for compensating a temperature characteristic of offset of the output of said another operational amplifier.

15. A physical quantity detection device comprising:

an operational amplifier;

a first resistor connected between an inverting input of said operational amplifier and a first reference potential;

a second resistor connected between said inverting input of said operational amplifier and a second reference potential, said first and second resistors having a first temperature coefficient of resistance;

a feedback resistor being connected between said inverting input of said operational amplifier and an output of said operational amplifier and having a second temperature coefficient of resistance; and a reference voltage generation circuit generating a reference voltage supplied to a non-inverting input of said operational amplifier, at least one of said first and second resistors comprising a sensing element of which resistance varies on the basis of a physical quantity with a temperature coefficient of sensitivity, wherein a difference between said first temperature coefficient of resistance and said temperature coefficient of sensitivity is substantially equal to said second temperature coefficient of resistance, wherein if it is assumed that a sensitivity of said sensing element at a reference temperature is S0, a resistance of said sensing element at said reference temperature is R0, and a resistance of said feedback resistor at said reference temperature is Rts0, then, it is represented that said sensitivity of said sensing element at a temperature t which is different from said reference temperature by T is S(T), said resistance of said sensing element at t is R(T), and said resistance of said feedback resistor at t is Rts(T), and S(T), R(T), and Rts(T) are further represented by:

S(T)=S0·(1+β1·T+β2·T$^2$), R(T)=R0·(1+α1·T+α2·T$^2$), and Rts(T)=Rts0·(1+A1·T+A2·T$^2$), where said α1, α2, β1, β2, A1 and A2 are temperature coefficients, and wherein said α1, α2, β1, β2, A1 and A2 are determined so as to establish both A1=α1−β1 and A2=α2−β2−β1·(α1−β1).

16. A physical quantity detection device comprising:

an operational amplifier;

a first resistor connected between an inverting input of said operational amplifier and a first reference potential;

a second resistor connected between said inverting input of said operational amplifier and a second reference potential, said first and second resistors having a first temperature coefficient of resistance;

a feedback resistor being connected between said inverting input of said operational amplifier and an output of said operational amplifier and having a second temperature coefficient of resistance; and a reference voltage generation circuit generating a reference voltage supplied to a non-inverting input of said operational amplifier, at least one of said first and second resistors comprising a sensing element of which resistance varies on the basis of a physical quantity with a temperature coefficient of sensitivity, wherein said reference voltage generation circuit sets said reference voltage to a middle potential between said first potential and said second reference potential.

17. A physical quantity detection device comprising:

an operational amplifier;

a first resistor connected between an inverting input of said operational amplifier and a first reference potential;

a second resistor connected between said inverting input of said operational amplifier and a second reference potential, said first and second resistors having a first temperature coefficient of resistance;

a feedback resistor being connected between said inverting input of said operational amplifier and an output of said operational amplifier and having a second temperature coefficient of resistor;

a reference voltage generation circuit generating a reference voltage supplied to a non-inverting input of said operational amplifier, at least one of said first and second resistors comprising a sensing element of which resistance varying on the basis of a physical quantity with a temperature coefficient of sensitivity, a third resistor;

another operational amplifier, an inverting input of said another operational amplifier being supplied with an output of said operational amplifier through said third resistor, a non-inverting input of said another operational amplifier being supplied with said reference voltage; and a fourth resistor disposed between an output terminal and inverting input of said another operational amplifer.

18. A physical quantity detection device comprising: an operational amplifier;
- a first resistor connected between an inverting input of said operational amplifier and a first reference potential;
- a second resistor connected between said inverting input of said operational amplifier and a second reference potential, said first and second resistors having a first temperature coefficient of resistance;
- a feedback resistor being connected between said inverting input of said operational amplifier and an output of said operational amplifier and having a second temperature coefficient of resistance; and
- a reference voltage generation circuit connected between said first and second reference potentials for generating a reference voltage directly supplied to a non-inverting input of said operational amplifier, at least one of said first and second resistors comprising a sensing element of which resistance varies on the basis of a physical quantity with a temperature coefficient of sensitivity, wherein a difference between said first temperature coefficient of resistance and said temperature coefficient of sensitivity is substantially equal to said second temperature coefficient of resistance, and wherein said reference voltage generation circuit sets said reference voltage to a middle potential between said first potential and said second reference potential.

19. The physical quantity detection device as claimed in claim 18, wherein said reference voltage generation circuit includes third and fourth resistors connected in series between said first and second reference potentials to generate a divided voltage as said reference voltage.

20. The physical quantity detection device as claimed in claim 19, wherein a temperature coefficient of resistance of said third resistor is substantially equal to a temperature coefficient of resistance of said fourth resistor so that said reference voltage can be kept constant irrespective of temperature variation.

21. A physical quantity detection device comprising:
an operational amplifier;
- a first resistor connected between an inverting input of said operational amplifier and a first reference potential;
- a second resistor connected between said inverting input of said operational amplifier and a second reference potential, said first and second resistors having a first temperature coefficient of resistance;
- feedback resistor means for providing feedback of said operational amplifier, wherein said feedback resistor means is connected between said inverting input of said operational amplifier and an output of said operational amplifier and includes a plurality of resistor elements to have a feedback resistance and a second temperature coefficient of resistance; and
- a reference voltage generation circuit generating a reference voltage supplied to a non-inverting input of said operational amplifier, at least one of said first and second resistors comprising a sensing element of which resistance varies on the basis of a physical quantity with a temperature coefficient of sensitivity, wherein a difference between said first temperature coefficient of resistance and said temperature coefficient of sensitivity is substantially equal to said second temperature coefficient of resistance, and wherein said reference voltage generation circuit sets said reference voltage to a middle potential between said first potential and said second reference potential.

22. The physical quantity detection device as claimed in claim 21, wherein at least one of said resistor elements comprises a trimming structure in resistance.

* * * * *